US007032538B1

(12) United States Patent
Lush

(10) Patent No.: US 7,032,538 B1
(45) Date of Patent: Apr. 25, 2006

(54) COLLAPSIBLE FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 0 days.

(21) Appl. No.: 11/023,069

(22) Filed: Dec. 27, 2004

(51) Int. Cl.
*A01K 61/02* (2006.01)

(52) U.S. Cl. ............... 119/52.1; 119/52.2; 119/459; 119/460; 119/57.8

(58) Field of Classification Search ........... 119/52.1, 119/52.2, 52.3, 429, 431, 61.31, 498, 499, 119/459, 460, 461, 57.8, 57.9
See application file for complete search history.

(56) References Cited

U.S. PATENT DOCUMENTS

| 218,266 | A | * | 8/1879 | Hendryx | 119/459 |
| 1,790,045 | A | * | 1/1931 | Harvey | 119/52.1 |
| 4,026,244 | A |  | 5/1977 | Salick | 119/51 R |
| 4,706,851 | A |  | 11/1987 | Hegedus et al. | 222/106 |
| 5,000,116 | A | * | 3/1991 | Fife et al. | 119/28.5 |
| 5,203,281 | A |  | 4/1993 | Harwich | 119/57.9 |
| 5,401,444 | A | * | 3/1995 | Spinello | 264/0.5 |
| 5,479,881 | A |  | 1/1996 | Lush et al. | 119/57.8 |
| 5,626,098 | A | * | 5/1997 | Askins et al. | 119/474 |
| 5,813,701 | A |  | 9/1998 | Noble | 285/4 |
| 5,915,735 | A |  | 6/1999 | Noble | 285/4 |
| 6,041,825 | A |  | 3/2000 | Smith et al. | 138/109 |
| 6,047,661 | A |  | 4/2000 | Lush | 119/51.01 |
| 6,073,582 | A |  | 6/2000 | Lush | 119/51.01 |
| 6,223,777 | B1 | * | 5/2001 | Smith et al. | 138/109 |
| 6,427,629 | B1 | * | 8/2002 | Lush | 119/52.1 |
| 6,487,990 | B1 | * | 12/2002 | McNew | 119/168 |
| 6,604,487 | B1 |  | 8/2003 | Lush | 119/57.9 |
| 6,763,973 | B1 | * | 7/2004 | Hudkins | 222/1 |
| 6,834,616 | B1 | * | 12/2004 | Fort, II | 119/57.8 |
| 2005/0145192 | A1 | * | 7/2005 | Axelrod et al. | 119/499 |
| 2005/0229866 | A1 | * | 10/2005 | Simpson et al. | 119/499 |

* cited by examiner

*Primary Examiner*—Teri Pham Luu
*Assistant Examiner*—Joshua Michener
(74) *Attorney, Agent, or Firm*—Thomte, Mazour & Niebergall; Dennis L. Thomte

(57) ABSTRACT

A collapsible feeder for birds, squirrels and the like comprising a plastic feeder body having a base and rim at the lower end thereof and a cover selectively closing the upper end thereof. The feeder body has a plurality of collapsible corrugations defining annular members that allow the body to extend and contract into extended and collapsed positions. The lower end of the feeder body is provided with feed outlets to enable feed within the feeder body to pass outwardly therethrough onto the base inwardly of the rim. The feeder body may also have a plurality of small openings or feeding stations formed in the corrugations to enable birds or the like to gain access to the feed within the feeder body. Preferably, the feeder body defines an inverted frusto-conical shape, but may have a frusto-conical shape as well as other shapes.

19 Claims, 3 Drawing Sheets

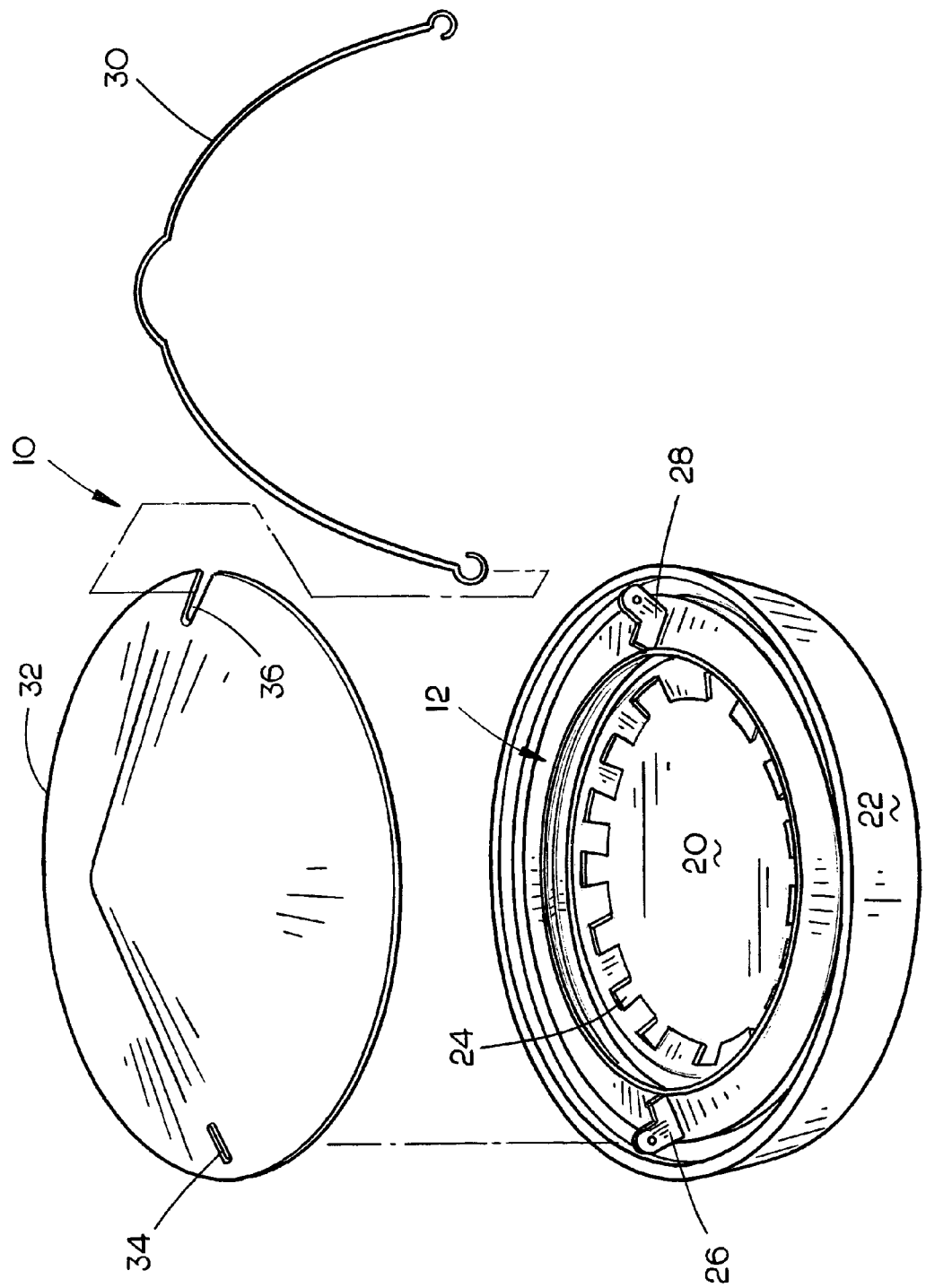

COLLAPSIBLE FEEDER

BACKGROUND OF THE INVENTION

1. Field of the Invention

This invention relates to a collapsible feeder and more particularly to a collapsible feeder for birds, squirrels and the like which is convenient to install, convenient for wild game to perch upon, and which yieldably remains in its extended position to facilitate the placement of feed therein.

2. Description of the Related Art

Selectively collapsible containers are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art including the Thistle Pouch brand feeder manufactured by Havegard Farm, Inc. of Algoma, Wis., and Feathered Friends E-Z Feeders brand wild bird feeder marketed by Canine's Choice of Marion, Ind. Other types of collapsible feeders are disclosed in U.S. Pat. Nos. 5,203,281; 4,706,871; and 4,026,025. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Wire mesh feeders constructed of rigid steel wire are also well-known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds. One further disadvantage of many collapsible feeders is that they are suited for only one size of feed.

In an effort to overcome the disadvantages of the prior art collapsible feeders, applicant previously designed collapsible feeders which are disclosed in U.S. Pat. Nos. 6,047,661; 6,073,582; and 6,427,629. In the '661 and '582 patents, the mesh openings were designed to accommodate a specific seed size. In the '629 patent, applicant's feeder body is comprised of a plurality of annular ring members. In the feeder of the '629 patent, the feeder body remains in its extended position through frictional engagement between the hollow body segments. Occasionally, the hollow body segments, even though in frictional engagement with one another, tend to collapse during the filing procedure unless the feeder is hanging from a support. The feeders of applicant's earlier patents truly represented a significant advance in the art and it is believed that the collapsible feeder described herein represents an improvement over applicant's earlier designs.

SUMMARY OF THE INVENTION

A collapsible feeder for birds, squirrels and the like is disclosed and includes a collapsible plastic feeder body having upper and lower ends. The plastic feeder body includes a plurality of collapsible corrugations which comprise lockable annular members that allow the body to extend, contract and yieldably lock into extended and contracted positions. The upper end of the feeder body defines a central feed fill opening which is selectively closed by a cover. A disc-shaped base and rim is secured to the lower end of the feeder body. The lower end of the feeder body has a plurality of feed outlets formed therein whereby feed in the feeder body may pass outwardly through the feed outlets onto the base inwardly of the rim. In the preferred embodiment, the feeder body defines an inverted frusto-conical shape although the body may define a frusto-conical shape. In the preferred embodiment, each of the corrugations includes upper and lower wall members, some of which have feed openings formed therein. Preferably, the body member is comprised of a transparent, translucent or clear blow-molded plastic material.

It is therefore a principal object of the invention to provide a selectively collapsible feeder for birds, squirrels and other wild game.

Yet another object of the invention is to provide a selectively collapsible feeder which is comprised of a plastic material except for the hanger and cover.

Still another object of the invention is to provide a selectively collapsible feeder which occupies a minimum of space for shipping and storage when empty.

Still another object of the invention is to provide a selectively collapsible feeder wherein the feeder body thereof is comprised of a plurality of corrugations which allow the body to extend, contract, and be locked in extended and contracted positions.

These and other objects will be obvious to those skilled in the art.

BRIEF DESCRIPTION OF THE DRAWINGS

FIG. 4 is an exploded perspective view of the feeder.

DESCRIPTION OF THE PREFERRED EMBODIMENT

Figure 1:
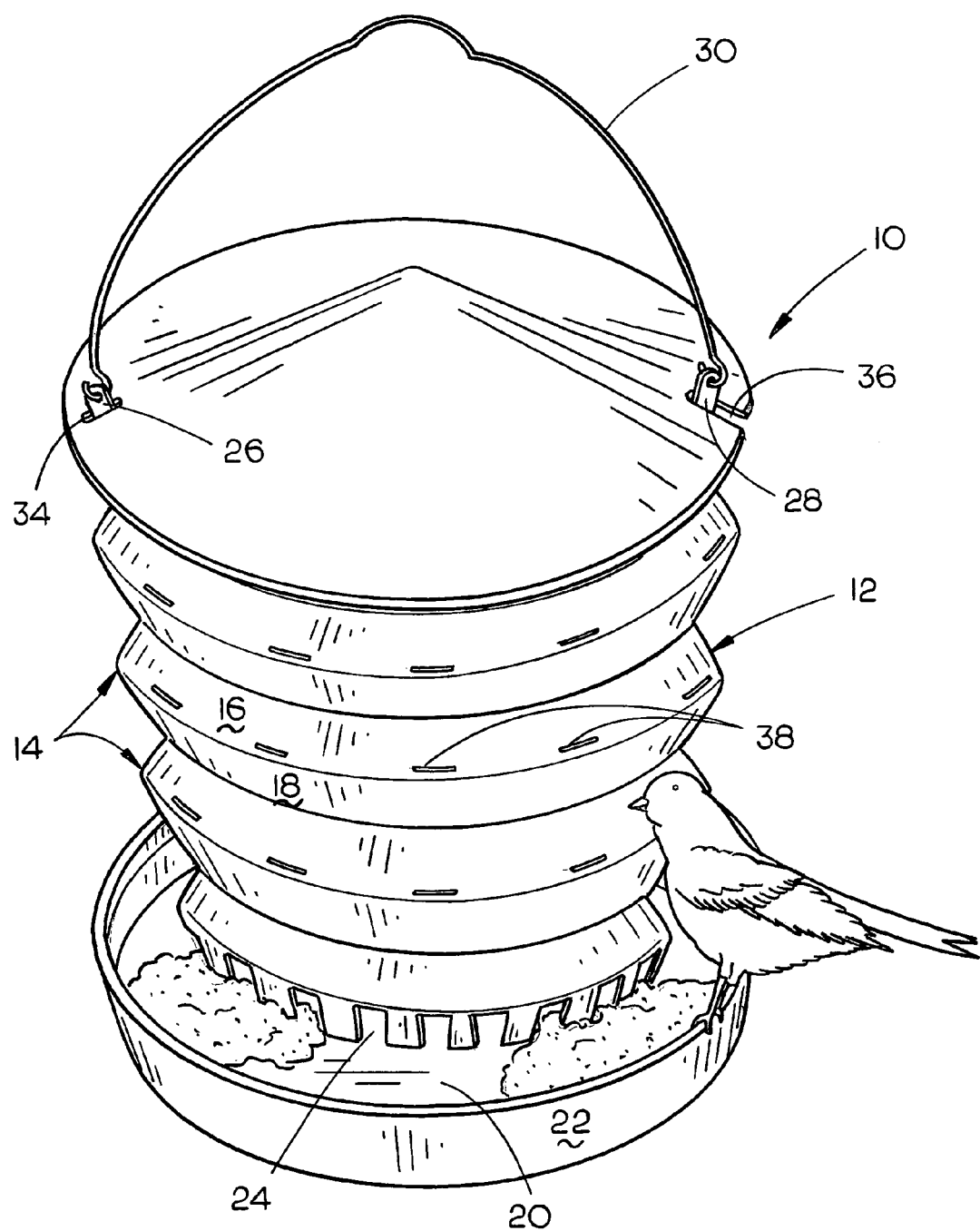
FIG. 1 is a perspective view of the collapsible feeder of this invention.
Figure 3:
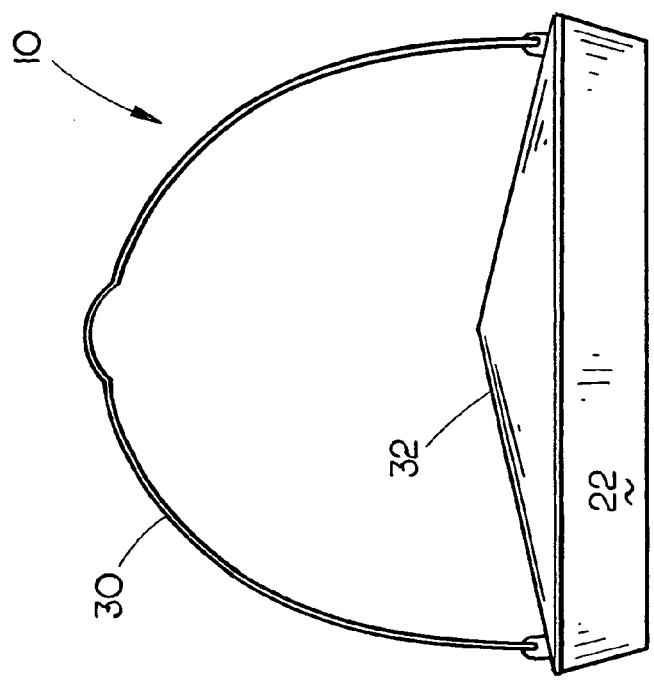
FIG. 3 is a side view of the feeder in a collapsed position.
Figure 2:
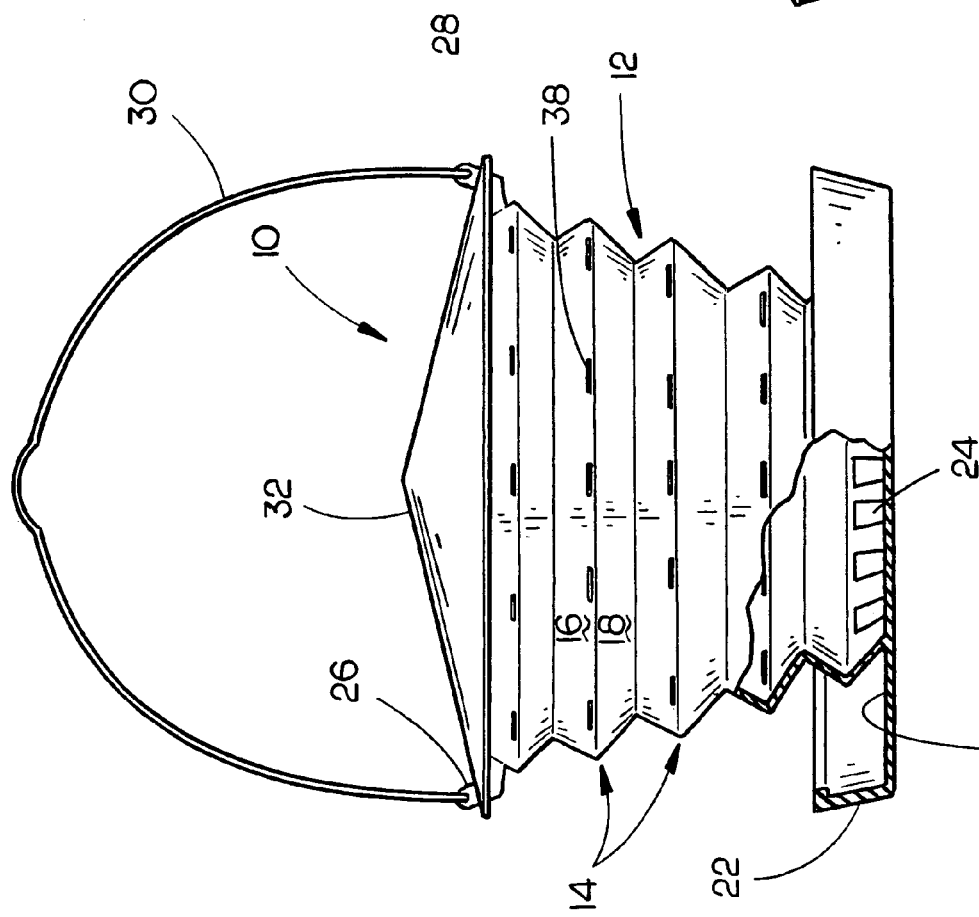
FIG. 2 is a side view of the feeder of FIG. 1 with a portion thereof cut away to more fully illustrate the invention.

The collapsible feeder of this invention is referred to generally by the reference numeral 10. Feeder 10 includes a feeder body 12 having upper and lower ends. Feeder body 12 is formed from a suitable plastic material and is collapsible. The feeder body includes a plurality of collapsible corrugations 14 comprising lockable annular members having a static side 16 and a movable side 18 wherein the collapsible corrugations comprising lockable annular members are incorporated by reference as disclosed in U.S. Pat. Nos. 5,813,701; 5,915,735; 6,041,825; and 6,223,777. Construction of the collapsible feeder body 12 through the use of the collapsible corrugations allows the body to extend, contract, and be locked in extended and contracted positions. Base 20 is secured to the lower end of the feeder body 12 and has an upstanding rim 22 provided at the outer periphery thereof. The base 20 and rim 22 may be integrally molded with the feeder body 12 or may be separately formed and then secured to the feeder body 12 by any convenient means.

The lower end of feeder body 12 is provided with a plurality of feed outlets 24 formed therein wherein feed in the feeder body may pass outwardly through the feed outlets 24 onto the base 20 inwardly of the rim 22.

The upper end of feeder body 12 includes a pair of tabs or ears 26 and 28 having openings therein. A hanger 30 is pivotally connected to the tabs or ears 26 and 28 for supporting the feeder from a suitable support, branch, etc. Hanger 30 could be secured to openings formed in the upper end of the feeder body 12 rather than being secured to the tabs or ears 26 and 28. The numeral 32 refers to a cone-shaped lid having an opening 34 formed therein adjacent one side thereof and a slot 36 formed therein opposite to opening 34. One end of hanger 30 extends downwardly through opening 34, in the manner illustrated, which prevents separation of the lid 32 from the feeder body 12. The other end of hanger 30 is received by the slot 36 to enable the lid to be easily raised so that the feed may be placed in the interior of the feeder body 12. While it is preferred that lid 32 be constructed of a metal material it may be constructed of a plastic material if so desired.

If the feeder is going to be utilized to feed small seeds, such as Niger, it is recommended that a plurality of small openings, slots or slits 38 be formed in either or both of the sides 16 and 18 of at least some of the corrugations 14. In some cases, if the openings 38 are used, the base, rim and feed outlets may be eliminated. If the feeder is used to feed nectar to hummingbirds, the base 20, rim 22 and feed outlets 24 will be omitted with suitable drinking stations being provided on the lower end of the feeder body 12.

The collapsible feeder body 12 of this invention may either define a frusto-conical shape or an inverted frusto-conical shape although the inverted frusto-conical shape illustrated in the drawings is the preferred embodiment.

The collapsible feeder of this invention will normally be in the collapsed position during shipment or storage with the configuration thereof occupying very little space in the collapsed position. When it is desired to move the feeder to its extended position for feeding or filling purposes, the hanger 30 is moved upwardly with respect to the base 20 to cause the movable sides 18 of the corrugations 14 to move with respect to the static sides 16 of the corrugations 14 so that the length of the feeder body is increased or extended. The collapsible corrugations 14 are essentially lockable annular members that allow the body to extend, contract, and be locked in extended and contracted positions. Thus, when the feeder body 12 is in its extended position, the lockable corrugations maintain the feeder body in the extended position which will prevent the feeder body from collapsing during the filling of the same. Further, the collapsible corrugations also yieldably maintain the feeder body in its collapsed position for packaging, storage and shipment. When feed is placed in the interior of the feeder body, when in its extended position, a certain amount of the feed passes outwardly through the feed outlets 24 onto the base 20 inwardly of the rim 22. The wild animals may perch on the rim 22 to feed. Further, the small openings, slots or slits 38 formed in the feeder body 12 enable birds to gain access to the feed in the feeder body 12.

It can therefore be seen that a novel bird feeder has been provided which may be collapsed for packaging, storage or shipment, but which may be extended for use.

Thus it can be seen that the invention accomplishes at least all of its stated objectives.

I claim:

1. A collapsible feeder for birds and small rodents, comprising:
    a collapsible plastic feeder body having upper and lower ends;
    said plastic feeder body including a plurality of collapsible corrugations, said collapsible corrugations comprising lockable annular members that allow said body to extend, contract and lock into extended and collapsed positions;
    said upper end of said feeder body defining a central feed fill opening;
    a cover selectively closing said central feed fill opening;
    and a disc-shaped base secured to said lower end of the feeder body;
    said feeder body having feed outlets formed therein at its said lower end whereby feed in the feeder body may pass outwardly through said feed outlets onto said base.

2. The collapsible feeder of claim 1 wherein an upstanding rim is provided on said base.

3. The collapsible feeder of claim 1 wherein a hanger is pivotally secured to said upper end of said feeder body.

4. The collapsible feeder of claim 3 wherein said hanger is selectively removably secured to said upper end of said feeder body.

5. The collapsible feeder of claim 1 wherein said feeder body is formed of a blow-molded plastic material.

6. The collapsible feeder of claim 5 wherein said plastic material is transparent.

7. The collapsible feeder of claim 5 wherein said plastic material is translucent.

8. The collapsible feeder of claim 1 wherein feed openings are provided in at least some of said corrugations.

9. The collapsible feeder of claim 8 wherein said feed openings are slits.

10. The collapsible feeder of claim 8 wherein said corrugations include upper and lower wall portions and wherein said feed openings are formed in at least some of said lower wall portions.

11. The collapsible feeder of claim 8 wherein said corrugations include upper and lower wall portions and wherein said feed openings are formed in at least some of said upper wall portions.

12. The collapsible feeder of claim 1 wherein said feeder body defines a frusto-conical shape.

13. The collapsible feeder of claim 1 wherein said feeder body defines an inverted frusto-conical shape.

14. A collapsible feeder for birds and small rodents, comprising:
    a collapsible plastic feeder body having upper and lower ends;
    said plastic feeder body including a plurality of collapsible corrugations, said collapsible corrugations comprising lockable annular members that allow said body to extend, contract and lock into extended and collapsed positions;
    said upper end of said feeder body defining a central feed fill opening;
    a cover selectively closing said central feed fill opening;
    and a disc-shaped base secured to said lower end of the feeder body to close the same;
    at least some of said corrugations having feed openings formed therein.

15. The collapsible feeder of claim 14 wherein a hanger is pivotally secured to said upper end of said feeder body.

16. The collapsible feeder of claim 14 wherein said feeder body defines a frusto-conical shape.

17. The collapsible feeder of claim 14 wherein said feeder body defines an inverted frusto-conical shape.

18. A collapsible feeder for birds and small rodents, comprising:

a collapsible plastic feeder body having upper and lower ends;

said plastic feeder body including a plurality of collapsible corrugations, said collapsible corrugations comprising annular members that allow said body to extend and contract into extended and collapsed positions;

said upper end of said feeder body defining a central feed fill opening;

a cover selectively closing said central feed fill opening;

and a disc-shaped base secured to said lower end of the feeder body;

said feeder body having feed outlets formed therein at its said lower end whereby feed in the feeder body may pass outwardly through said feed outlets onto said base.

19. A collapsible feeder for birds and small rodents, comprising:

a collapsible plastic feeder body having upper and lower ends;

said plastic feeder body including a plurality of collapsible corrugations, said collapsible corrugations comprising annular members that allow said body to extend and contract into extended and collapsed positions;

said upper end of said feeder body defining a central feed fill opening;

a cover selectively closing said central feed fill opening;

said lower end of said feeder body being closed;

said feeder body having feed outlets formed therein.

* * * * *